United States Patent [19]
Ameri

[11] Patent Number: 6,118,677
[45] Date of Patent: Sep. 12, 2000

[54] MOTION CONTROL SYSTEM HAVING AN AUXILIARY POWER SUPPLY

[75] Inventor: Masoud Ameri, Independence, Minn.

[73] Assignee: MTS Systems Corporation, Eden Prairie, Minn.

[21] Appl. No.: 09/450,297

[22] Filed: Nov. 29, 1999

Related U.S. Application Data

[60] Provisional application No. 60/110,306, Nov. 30, 1998.
[51] Int. Cl.[7] .............................. H02M 5/45; H02M 7/00; H02J 7/14
[52] U.S. Cl. ................................. 363/37; 363/65; 307/77
[58] Field of Search .................................. 363/37, 39, 40, 363/41, 65, 34, 98; 323/205, 207, 266; 307/77, 82, 80; 318/268

[56] References Cited

U.S. PATENT DOCUMENTS

| | | | |
|---|---|---|---|
| 4,855,652 | 8/1989 | Yamashita et al. | 318/268 |
| 4,884,182 | 11/1989 | Ando et al. | 363/37 |
| 4,937,720 | 6/1990 | Kirchberg | 363/41 |
| 5,132,606 | 7/1992 | Herbert | 323/266 |
| 5,136,494 | 8/1992 | Akagi et al. | 363/34 |
| 5,198,970 | 3/1993 | Kwabata et al. | 307/66 |
| 5,285,029 | 2/1994 | Araki | 363/37 |
| 5,461,301 | 10/1995 | Truong | 323/207 |
| 5,886,884 | 3/1999 | Back et al. | 363/48 |
| 5,963,442 | 10/1999 | Yoshida et al. | 363/98 |

*Primary Examiner*—Shawn Riley
*Assistant Examiner*—Rajnikant B. Patel
*Attorney, Agent, or Firm*—Westman, Champlin & Kelly; S. Koehler

[57] ABSTRACT

A motion control system includes an inverter adapted to receive electrical power at a first DC voltage level and selectively provides power to a motor. A first DC—DC converter receives electrical power at the first DC voltage level and provides electrical power at a second DC voltage level. A second DC—DC converter receives electrical power at the second DC voltage level and provides electrical power at a third DC voltage level. A controller receives electrical power at the third DC voltage level and provides control signals to the inverter. A switching circuit is connectable to a second source of power and provides electrical power to the second DC—DC converter when the second DC voltage is less than a selected threshold.

13 Claims, 1 Drawing Sheet

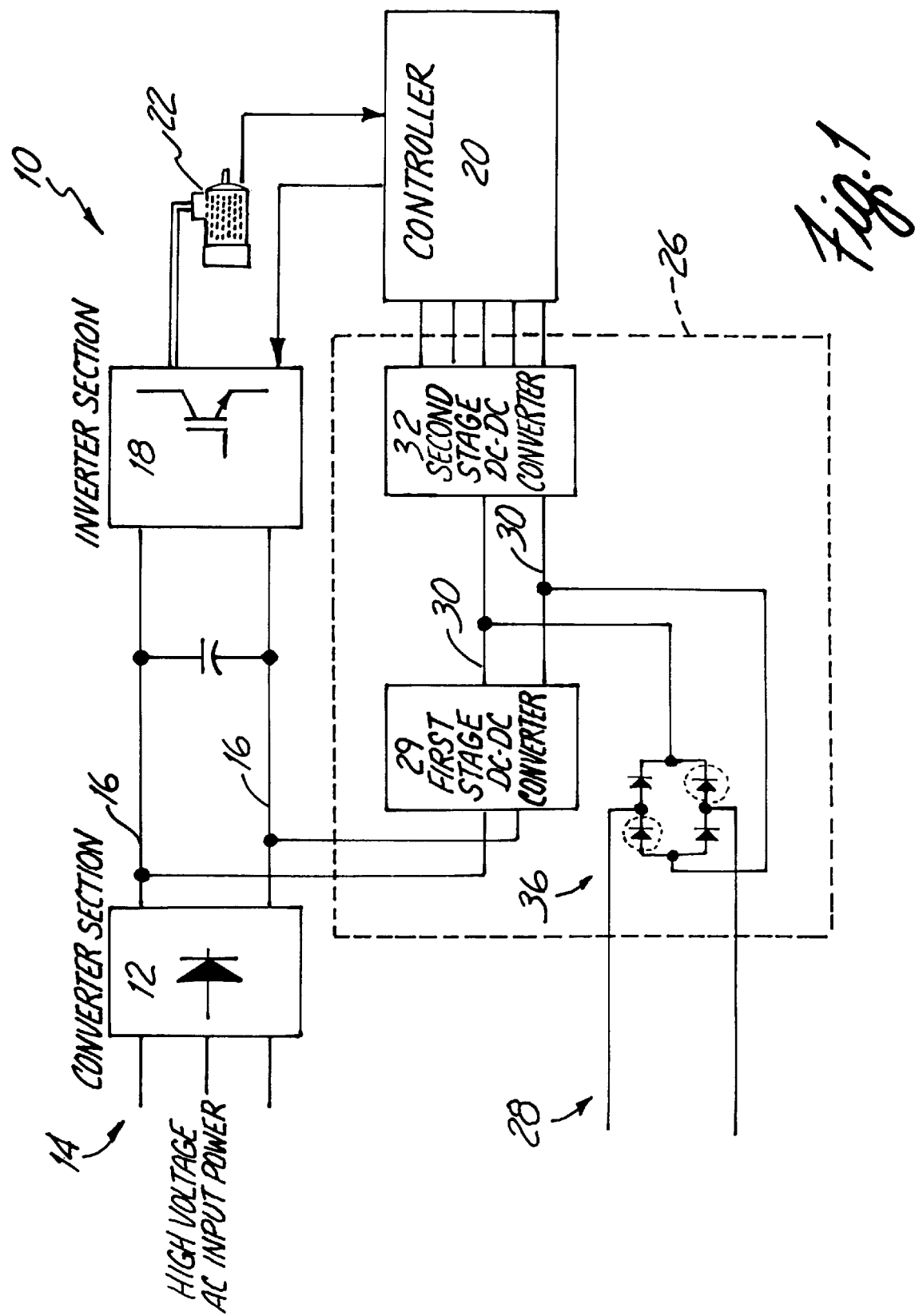

MOTION CONTROL SYSTEM HAVING AN AUXILIARY POWER SUPPLY

CROSS-REFERENCE TO RELATED APPLICATION

This application is based on and claims priority of Provisional Patent Application Ser. No. 60/110,306, filed Nov. 30, 1998, the content of which is also hereby incorporated by reference in its entirety.

BACKGROUND OF THE INVENTION

The present invention relates to motion control systems used, for example, in rotary and linear brushless direct current motors. More particularly, the present invention relates to a power supply for such systems.

In many motion control systems, electrical power is commonly provided with high voltage alternating current (AC) or direct current (DC). The high voltage electrical power is used to power a motor or other power consuming device. In a motor, an inverter receives electrical power at a first DC voltage level and selectively provides power to windings of the motor based on command signals from a controller. The controller includes a control circuit comprising low level logic devices and a power supply. The power supply commonly converts the high voltage power to a low voltage level suitable for operation of the logic devices. Unfortunately, when high voltage power is cut or turned off, so is the power to the controller. Therefore, auxiliary power is generally provided once the high voltage has been turned off. Unfortunately, with the momentary loss of power to the controller, operating conditions have changed, which may complicate diagnostic analysis if the controller is malfunctioning.

In addition, the position of the moving member is typically lost with power removal, which requires the operator to perform a "homing" operation in order to reestablish the moving member in a known position with respect to the system. Although the homing operation or procedure properly positions the moving member with respect to the system, the homing procedure increases the downtime of the system.

Accordingly, there is a need for a system to provide continuous power to the motion control system.

SUMMARY OF THE INVENTION

A motion control system includes an inverter adapted to receive electrical power at a first DC voltage level and selectively provided power to a motor. A first DC—DC converter receives electrical power at the first DC voltage level and provides electrical power at a second DC voltage level. A second DC—DC converter receives electrical power at the second DC voltage level and provides electrical power at a third DC voltage level. A controller receives electrical power at the third DC voltage level and provides control signals to the inverter. A switching circuit is connectable to a second source of power and provides electrical power to the second DC—DC converter when the second DC voltage is less than a selected threshold.

Another aspect of the present invention is a method of operating a motion control system wherein if electrical power is sufficient at a first DC voltage level, the method includes: converting electrical power with a first DC—DC converter from a first DC voltage level to a second DC voltage level; converting electrical power with a second DC—DC converter from a second DC voltage level to a third DC voltage level; powering a controller with electrical energy at the third DC voltage level; inverting electrical energy at the first DC voltage level and providing the electrical energy to a motor. However, if the second DC voltage level is less than a selected threshold, the method includes: obtaining electrical power from a second source and providing electrical power to the second DC—DC converter; converting electrical power with the second DC—DC converter; and powering the controller with electrical power from the second DC—DC converter.

BRIEF DESCRIPTION OF THE DRAWING

FIG. 1 is a block diagram of an exemplary motion control system of the present invention.

DETAILED DESCRIPTION OF THE ILLUSTRATIVE EMBODIMENTS

FIG. 1 schematically illustrates an exemplary embodiment of a motion control system 10 of the present invention. Generally, the motion control system 10 includes a converter 12 that receives alternating current (AC) electrical power at 14 and converts the AC electrical power to direct current (DC) electrical at a first DC voltage level across conductors 16. An inverter 18 receives the DC electrical power at the first DC voltage level and, based on command signals received from a controller 20, provides electrical power to a motor 22. The converter 12, the inverter 18 and the controller 20 are well known devices, which can take many forms. Commonly, the controller 20 operates using analog and/or digital components to generate command signals for the inverter 18 based on a desired operating condition of the motor 22 and feedback provided therefrom. The motor 22 can be a rotary or linear motor.

The motion control system 10 further includes a two stage power supply 26 that provides electrical power to the controller 26 either from electrical power obtained at the first DC voltage level or electrical power obtained from a second source of electrical power (AC or DC) indicated at 28. Referring first to power obtained at the first DC voltage level across the conductors 16, the two stage power supply 26 includes a first DC—DC converter 29 that converts electrical power at the first DC voltage level to electrical power at a second DC voltage level across conductors 30. The second DC voltage level is typically less than the first DC voltage level. A second DC—DC converter 32 is also provided and receives electrical power at the second DC voltage level and provides electrical power at a third DC voltage level, which is typically less than the second DC voltage. Typically, however, other power supply voltages (AC or DC) besides the third DC voltage level are provided to the controller 20.

Power originates from the first DC voltage level through the first DC—DC converter 29 and the second DC—DC converter 32 as long as the first DC voltage level is sufficient or maintained. This typically is normal operation of the motor 22.

In the event servicing of the motion control system 10 is required or during emergency stops of the motor 22 where the voltage across conductors 16 is reduced to zero, power can still be provided to the controller 20 for diagnostic or other reasons from the second source of electrical power 28 (typically low voltage) through a switching circuit 36 and the second DC—DC converter 32. In a preferred embodiment, the switching circuit 36 automatically provides electrical power from the second source of electrical power 28 when the second DC voltage level across conductors 30 is less than a selected threshold, thus providing uninterrupted power. Preferably, the switching circuit 36 also blocks power flow between the conductors 30 and the second source of electrical power 28 when the second DC voltage level across conductors 30 is above the selected threshold.

In the embodiment illustrated, the switching circuit 36 comprises a diode circuit and, in particular, a rectifying circuit that provides electrical power or blocks electrical power as a function of the selected threshold. If the second source of electrical power 28 is a DC source, the switching circuit 36 can be a half bridge rectifying circuit. However, if it is desirable that the second source of electrical power 28 be an AC source of electrical power, the switching circuit 36 can be a full bridge rectifying circuit. As appreciated by those skilled in the art, the terms "first DC voltage level", "second DC voltage level" and "third DC voltage level" may not be static levels in that the levels may fluctuate within tolerable limits, as is well known in the art. In addition, the second source of electrical power 28 need not provide electrical energy at exactly the second voltage level wherein the second DC—DC converter 32, as is well known in the art, can accept or receive electrical energy within a range yet still provide the desired output voltages to the controller 20.

Although the present invention has been described with reference to preferred embodiments, workers skilled in the art will recognize that changes may be made in form and detail without departing from the spirit and scope of the invention.

What is claimed is:

1. A motion control system comprising:
   an inverter adapted to receive electrical power at a first DC voltage level and selectively provide power to a motor;
   a first DC—DC converter adapted to receive electrical power at the first DC voltage level and provide electrical power at a second DC voltage level;
   a second DC—DC converter adapted to receive electrical power at the second DC voltage level and provide electrical power at a third DC voltage level;
   a controller adapted to receive electrical power at the third DC voltage level and provide control signals to the inverter;
   secondary input terminals adapted to receive electrical power from a second source; and
   a switching circuit 36 connected to the secondary input terminals and the second DC—DC 32 converter, the switching circuit blocking power flow between the second source and the second DC—DC converter when the second DC voltage level is above a selected threshold and providing electrical power from the second source to the second DC—DC converter when the second DC voltage level is less than the selected threshold.

2. The motion control system of claim 1 wherein the switching circuit comprises a diode circuit.

3. The motion control system of claim 1 wherein the switching circuit comprises a half bridge rectifying circuit.

4. The motion control system of claim 1 wherein the switching circuit comprises a full bridge rectifying circuit.

5. The motion control system of claim 1 and further comprising a converter adapted to receive AC electrical power at a first AC voltage level and provide electrical power at the first DC voltage level.

6. The motion control system of claim 1 wherein the second DC voltage level is less than the first DC voltage level.

7. The motion control system of claim 6 wherein the third DC voltage level is less than the second DC voltage level.

8. A method of operating a motion control system comprising:
   if electrical power is sufficient at a first DC voltage level:
      converting electrical power with a first DC—DC converter from a first DC voltage level to a second DC voltage level;
      converting electrical power with a second DC—DC converter from a second DC voltage level to a third DC voltage level;
      powering a controller with electrical energy at the third DC voltage level;
      inverting electrical energy at the first DC voltage level and providing the electrical energy to a motor;
   if the second DC voltage level is less than a selected threshold:
      obtaining electrical power from a second source and providing the electrical power to the second DC—DC converter;
      converting electrical power with the second DC—DC converter; and
      powering the controller with electrical power from the second DC—DC converter.

9. The method of claim 8 wherein obtaining electrical power includes blocking power flow between the second source and the second DC—DC converter when the second DC voltage level is greater than the selected threshold.

10. The method of claim 9 wherein obtaining electrical power includes rectifying electrical power from the second source.

11. The method of claim 8 wherein the second DC voltage level is less than the first DC voltage level.

12. The method of claim 11 wherein the third DC voltage level is less than the second DC voltage level.

13. A motion control system comprising:
   inverter means for inverting electrical power at a first DC voltage level and providing power to a motor;
   first converter means for converting electrical power at the first DC voltage level to electrical power at a second DC voltage level;
   second converter means for converting electrical power at the second DC voltage level to electrical power at a third DC voltage level;
   controller means receiving electrical power at the third DC voltage level and providing control signals to the inverter means; and
   switching means for blocking power flow between a second source of electrical power and the second DC—DC converter when the second DC voltage level is above a selected threshold and providing electrical power from the second source to the second DC—DC converter when the second DC voltage level is less than the selected threshold.

* * * * *

UNITED STATES PATENT AND TRADEMARK OFFICE
CERTIFICATE OF CORRECTION

PATENT NO. : 6,118,677
DATED : September 12, 2000
INVENTOR(S) : Masud Ameri

It is certified that error appears in the above-identified patent and that said Letters Patent is hereby corrected as shown below:

Column 3, line 47, delete "36"

Column 3, line 48, delete "32"

Signed and Sealed this

Fifteenth Day of May, 2001

Attest:

NICHOLAS P. GODICI

Attesting Officer

Acting Director of the United States Patent and Trademark Office